No. 854,775.  
PATENTED MAY 28, 1907.
L. M. TAYLOR.  
GAGE FOR SAW TEETH.  
APPLICATION FILED JULY 24, 1906.
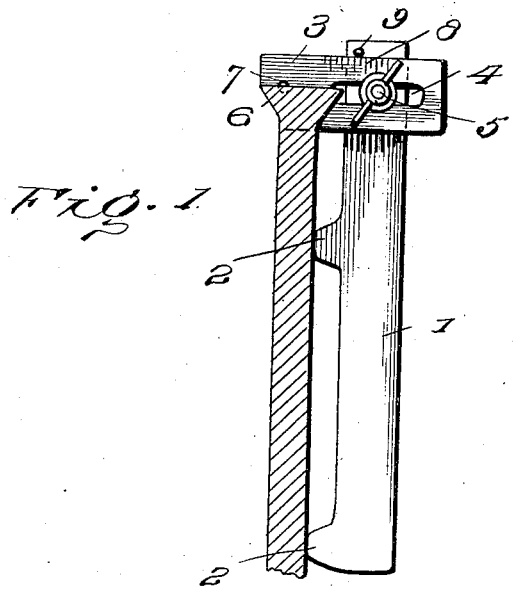
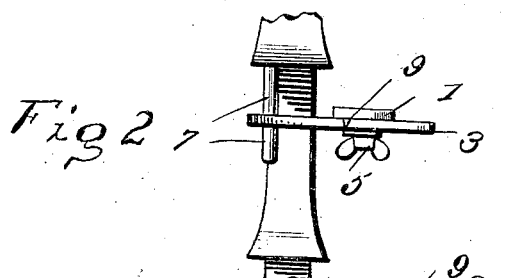
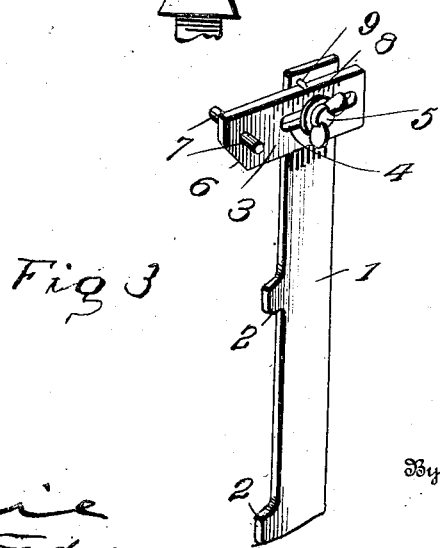
Witnesses  
Inventor  
L. M. Taylor  
By  
Attorneys

UNITED STATES PATENT OFFICE.

LAWRENCE M. TAYLOR, OF MULVANE, WEST VIRGINIA.

GAGE FOR SAW-TEETH.

No. 854,775.

Specification of Letters Patent.

Patented May 28, 1907.

Application filed July 24, 1906. Serial No. 327,572.

*To all whom it may concern:*

Be it known that I, LAWRENCE M. TAYLOR, a citizen of the United States, residing at Mulvane, in the county of Fayette and State of West Virginia, have invented certain new and useful Improvements in Gages for Saw-Teeth, of which the following is a specification.

The present invention relates to an improved gage for saw teeth by the use of which the teeth of a saw can be accurately and quickly placed in the best possible condition for the most efficient service.

The gage is designed so as to be employed in connection with any of the common forms of saws and consists essentially of a body portion fitting against one face of the saw, and a peculiarly constructed gage plate adjustably connected to the body portion and fitting between the teeth of the saw, the outer end of the gage plate being beveled on an angle corresponding to the required angle of the tooth. This gage is adapted to be held in position upon one side of the saw, while a file is employed upon the opposite side of the saw to bring the side of a tooth down to the beveled end of the gage plate.

For a full understanding of the invention and the merits thereof and also to acquire a knowledge of the details of construction of the means for effecting the result, reference is to be had to the following description and accompanying drawings, in which:

Figure 1 is a side elevation showing the application of the device; Fig. 2 is a top plan view of the same; and, Fig. 3 is a perspective view of the saw tooth gage.

Corresponding and like parts are referred to in the following description and indicated in all the views of the drawings by the same reference characters.

The numeral 1 designates the body portion of the saw tooth gage which is preferably in the form of a bar adapted to fit against one of the faces of the saw and provided upon one side with the spaced lugs 2. These lugs form bearing points for the bar 1 and hold the same slightly spaced from the saw and in a fixed position with relation thereto. The gage plate 3 is adjustably connected to one end of the bar 1 so as to be moved back and forth according to the width it is desired to impart to the saw teeth. This adjustable connection is accomplished by means of a longitudinal slot 4 formed in the gage plate and through which the clamping screw 5 passes by means of which the gage plate is secured to the body portion. This gage plate 3 fits between the teeth of the saw when in use and has the outer end thereof beveled as seen at 6 on an angle corresponding to that which it is desired to impart to the sides of the saw teeth. In order to hold the gage plate in a steady position and to prevent the same from any lateral movement when in position between the teeth, projections 7 are formed upon opposite sides thereof which are adapted to engage with the extremities of the two teeth between which the gage plate is placed. In the preferred construction, these projections 7 are formed by means of a pin which is passed through the plate and extends outwardly upon opposite sides thereof. In the present instance, it will be observed that the gage plate has a width somewhat greater than the depth or length of the saw teeth and extends outwardly somewhat beyond the same. While this feature is not necessary for the proper working of the invention, it somewhat facilitates the formation of the projections 7. By setting the gage plate in the proper position, the teeth can be dressed down to any desired width. In order that this may be quickly and accurately accomplished, a scale 8 is formed upon the gage plate, in the present instance adjacent the slot 4, and a pointer or indicator 9 is placed upon the bar 1. It will thus be seen that all that is necessary in setting the tool is to move the gage plate upon the bar 1 until the pointer 9 indicates upon the scale 8 the desired width of tooth.

In the application of the tool, the body portion 1 is placed against one face of the saw to be dressed so that the gage plate 3 fits between two adjacent teeth of the saw as indicated in Fig. 2. While the gage is thus held in position, a file is applied to the opposite side of the saw and the teeth brought down flush with the beveled portion 6 of the gage plate. It might be mentioned here that in the practical construction of the gage, the plate 3 is preferably formed of hardened metal so as to resist the action of a file. After one side of the tooth has been dressed, the gage is placed in position against the opposite face of the saw and the opposite side of the tooth dressed in a similar manner. It will thus be understood that with this gage, the teeth of the saw are not only brought down to a uniform width or spread, but are brought accurately in alinement with each other and the sides of the teeth are beveled from the extremities, thus placing the saw in the best possible condition. Owing to the fact that the gage is in position during the filing operation when the tooth is brought down flush with the beveled portion 6, much less time is required than where the gage must be removed while the teeth are being filed.

Having thus described the invention, what is claimed as new is:

In a gage for saw teeth, the combination of a body portion adapted to fit against one face of the saw, a gage plate projecting laterally from the body portion and adapted to fit between the teeth of the saw, the said gage plate having its outer end beveled on an angle corresponding to the angle for the saw teeth, and a transversely disposed pin passing through the gage plate, the ends of the pin projecting from opposite sides of the gage plate and being adapted to engage with the inner edges of adjacent saw teeth to prevent any lateral movement of the gage plate.

In testimony whereof I affix my signature in presence of two witnesses.

LAWRENCE M. TAYLOR. [L. S.]

Witnesses:
M. M. McCUTCHEN,
IDA WALKER.